United States Patent [19]

Burke et al.

[11] Patent Number: 4,541,449

[45] Date of Patent: Sep. 17, 1985

[54] GATE VALVE

[75] Inventors: James S. Burke; David L. Miller; Edmund A. Fisher, all of Houston, Tex.

[73] Assignee: Cameron Iron Works, Inc., Houston, Tex.

[21] Appl. No.: 489,494

[22] Filed: Apr. 28, 1983

[51] Int. Cl.[4] .................. F16K 17/38; F16K 3/02
[52] U.S. Cl. ...................................... 137/72; 137/74; 251/328; 251/174
[58] Field of Search ............. 251/328, 174, 172; 137/74, 72

[56] References Cited

U.S. PATENT DOCUMENTS

| 1,488,296 | 3/1924 | Stevens | 251/174 |
| 2,985,421 | 5/1961 | Anderson et al. | 251/172 |
| 3,006,599 | 10/1961 | Eckert, Jr. | 251/174 X |
| 3,273,855 | 9/1966 | Wells | 251/174 X |
| 3,307,826 | 3/1967 | Lowrey | 251/172 X |
| 4,124,194 | 11/1978 | Alvarez | 251/174 X |
| 4,290,581 | 9/1981 | Moran et al. | 251/172 |

FOREIGN PATENT DOCUMENTS 1514463 6/1978 United Kingdom ............. 251/328

Primary Examiner—Arnold Rosenthal
Attorney, Agent, or Firm—Vinson & Elkins

[57] ABSTRACT

An improved gate valve having a body with an inlet into the valve chamber and an outlet from the chamber, a gate in the chamber, a bonnet with an opening therethrough, secured to the body, a stem connected to operate the gate and extending through the bonnet opening, a seat in the bonnet, a shoulder on the stem, heat responsive means holding the stem out of back seating position during normal operation and releasing to back seat responsive to excess heat, body bushing surrounding said inlet and outlet and sealing against the gate, each of the bushings having resilient sealing means and a sealing lip for sealing against a sealing surface on said body.

3 Claims, 3 Drawing Figures

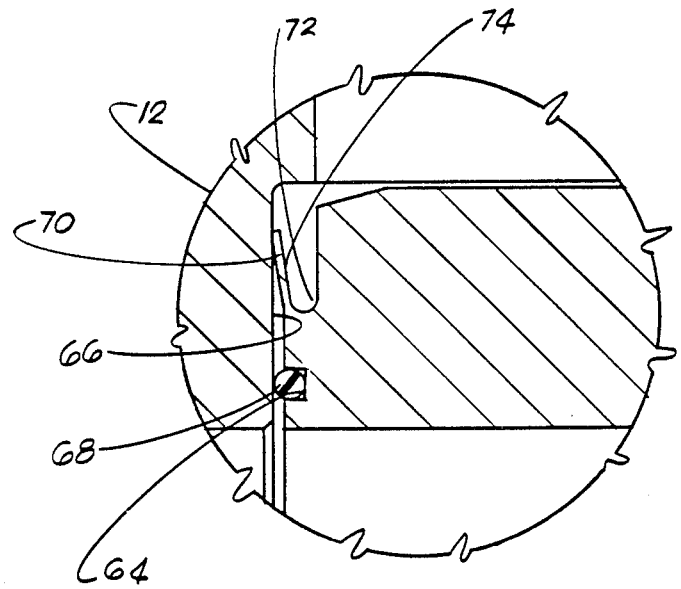

GATE VALVE

BACKGROUND

Gate valves have long been used in fluid lines. When the fluid flowing through the line is flammable it is desirable that the gate valve effectively shut off the flow of the fluid without any leakage past the gate or to the exterior of the valve, particularly when the valve is in an area of fire. Since most stem seals fail when subjected to excess heat or fire a gate valve stem has been made which engages an internal seat in the bonnet to provide a metal-to-metal stem seal responsive to excess heat or fire. Such an improved structure is shown in the L. E. Williams et al U.S. Pat. No. 4,214,600.

Examples of attempts to provide a seal against the valve member after the elastomeric seals have deteriorated responsive to excess heat or fire are shown in U.S. Pat. Nos. 3,480,253 and 3,497,178. U.S. Pat. No. 3,480,253 discloses a ball valve having polymeric seals backed up by metal seal rings with flanges directed toward the sealing surfaces and an annular wave spring urging the metal rings toward sealing engagement when the polymeric seals are destroyed by heat. U.S. Pat. No. 3,497,178 discloses another ball valve with a polymeric seal and a lip on the body which engages the ball when the polymeric seal is destroyed by heat. This lip is not flexible and engages its sealing surface on the ball at substantially a right angle. Neither of these structures provides any sealing which would be effective against a body sealing surface which has been distorted by the heat.

Such gate valves have included seat bushings interposed between the gate and the body and surrounding the inlet and outlet. Such bushings have included the usual elastomeric seal as a primary seal between the bushing and body and rely on metal-to-metal seal of the bushing against the mating body surface. It has been discovered that when a gate valve has been subjected to fire such mating body surface becomes distorted and thus destroys the seal between the bushing on the body.

SUMMARY

The present invention relates to an improved gate valve for use in lines carrying flammable fluids. The improved gate valve includes a body with an inlet to a chamber, an outlet from the chamber, a gate in the chamber, a bonnet secured to the body with an opening therethrough and a stem seat defined in said opening, a stem secured to said gate with a shoulder thereon and extending through the opening, means allowing outward movement of the stem for backseating of the shoulder on the stem seat responsive to excess temperature, a bushing on either side of the gate surrounding the inlet and outlet, each bushing having an inclined and outwardly facing sealing lip engaging a sealing surface on the body and held in sealing engagement by fluid pressure and means coacting with the stem to move the gate in the chamber.

An object of the present invention is to provide an improved gate valve which when subject to fire or excess heat does not leak.

Another object is to provide an improved gate valve which when subjected to fire or excess heat is still capable of shutting off the fluid flowing through the line.

A further object is to provide an improved gate valve which assures sealing between the gate bushing and the body even when the body sealing surface has been distorted by fire or excess heat.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
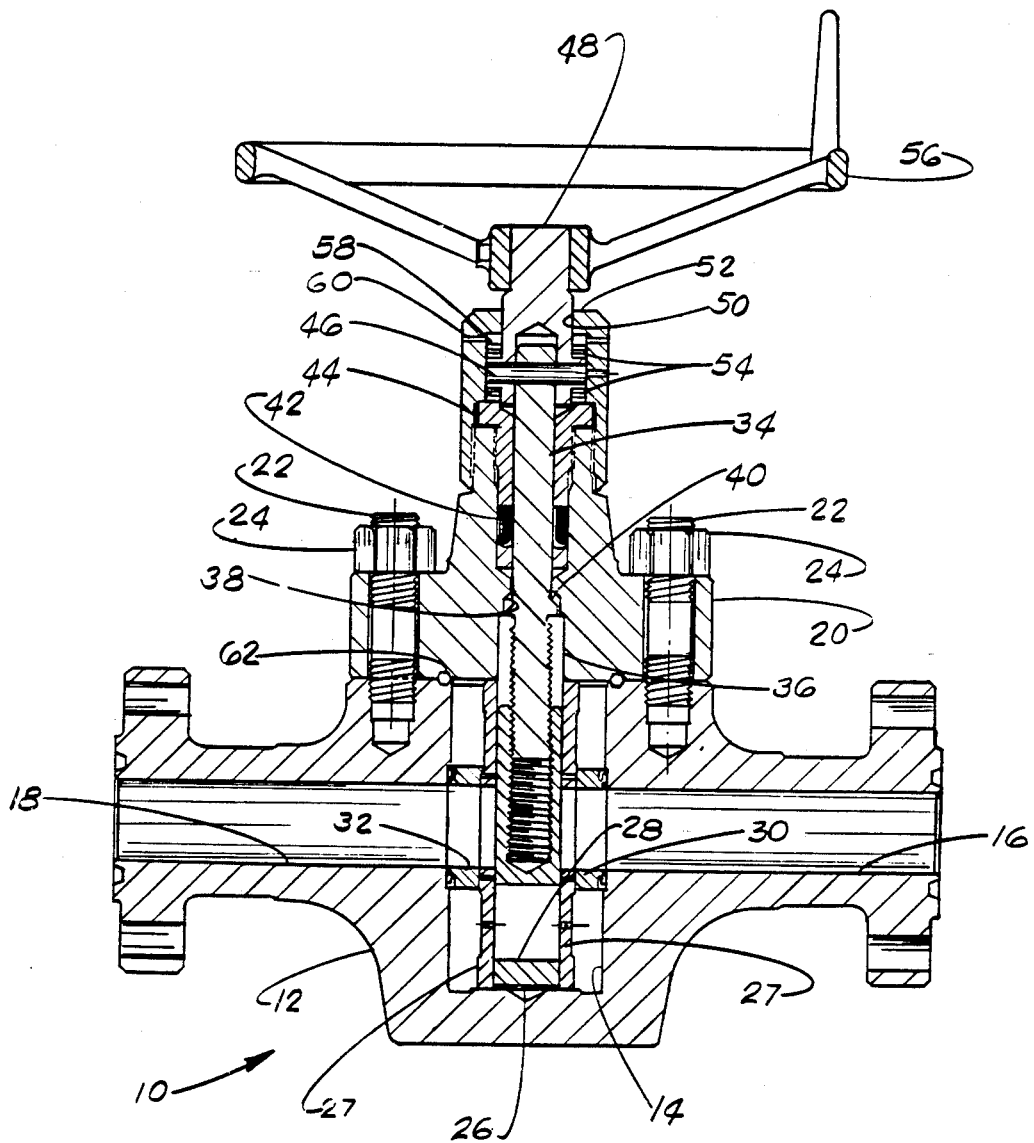
FIG. 1 is a sectional view of the improved gate valve of the present invention.

Gate valve 10 shown in the drawings includes a body 12 having chamber 14 therein with inlet 16 communicating thereto and outlet 18 communicating therefrom and bonnet 20 secured to body 12 by studs 22 and nuts 24 thereby closing the opening of chamber 14. Gate 26 having port 28 therethrough is positioned in chamber 14 between seal plates 27 which are against bushings 30 and 32 which surround the openings of inlet 16 and outlet 18 into chamber 14. Stem 34 has its inner end threaded into gate 26 and extends outward through opening 36 in bonnet 20.

Seat 38 is provided in bonnet opening 36 to coact with shoulder 40 on the exterior of stem 34 to provide back-seating of stem 34 with a metal-to-metal seal in the event of fire or excessive heat as hereinafter described. Normal sealing between stem 34 and bonnet opening 36 is provided by packing 42 with gland nut 44 threaded into bonnet opening 36 to load packing 42. Pin 46 extends through the outer portion of stem 34 to connect to stem extension 48 which extends through opening 50 in cap 52 which is threaded onto the outer exterior of bonnet 20. Bearings 54 are provided to support free rotation of stem 34 and stem extension 48 by handwheel 56 which is secured to the portion of stem extension 48 beyond cap 52. Rotation of stem 34 causes gate 26 to move between its open and closed positions.

In order to allow this backseating, fusible material 58 is positioned within cap 52 to support bearings 54 in a position holding shoulder 40 spaced from seat 38 as shown in FIG. 1. Whenever fusible material 58 is heated to its melting point, it melts and drains through port 60 in cap 52. Since it no longer supports bearings 54, stem 34 and stem extension 48 move outward responsive to internal pressure to bring shoulder 40 into sealing engagement with seat 38. This prevents leakage through bonnet opening 36 even though packing 42 would not seal since it would be destroyed by such excess heat. Suitable metal-to-metal seals are provided between the body and the bonnet and between the gate, its plates, and the bushings.

Thus, with all of these seals which operate to provide suitable sealing even when exposed to fire it is important that a suitable seal be provided between the downstream bushing and the body. It is known that the sealing surface on the body when subjected to fire is distorted to form a wavy pattern in the plane of the sealing surface.

Figure 2:
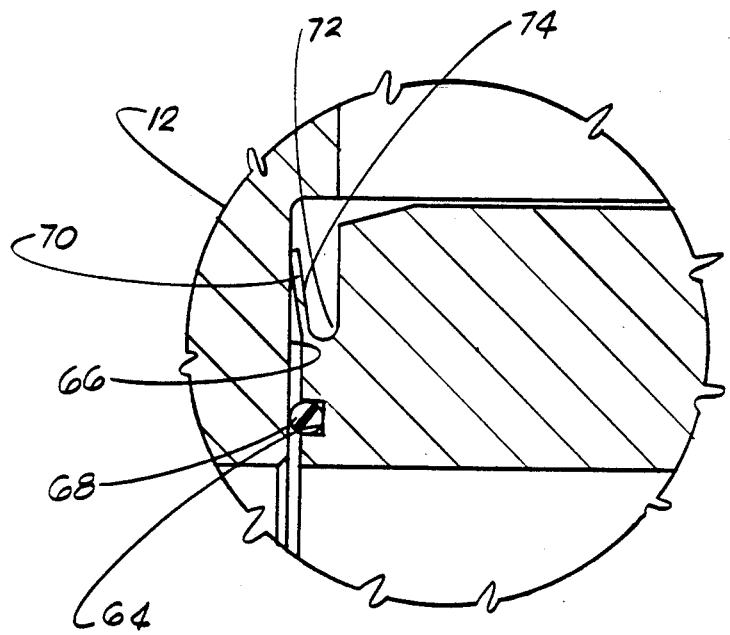
FIG. 2 is a detail partial sectional view of the bushing seal in its normal position.
Figure 3:
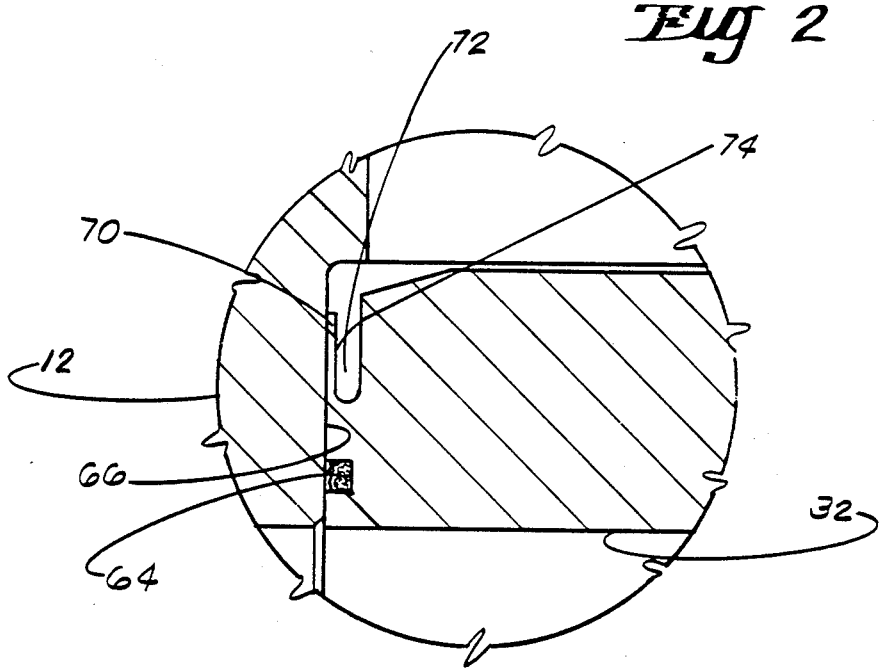
FIG. 3 is a similar sectional view of the bushing seal in its sealing position following exposure to fire.

Improved bushings 30 and 32 are designed to provide a metal-to-metal sealing against the distorted sealing surface on body 12. Bushings 30 and 32 are rings and provide such sealing. A section of bushing 32 is shown in FIGS. 2 and 3. Bushing 32 includes groove 64 facing sealing surface 66 on body 12 and containing suitable resilient sealing ring 68. Lip 70, integral with bushing 32 and separated therefrom by radial groove 72, extends outward and inclines toward surface 66 as best seen in FIG. 2. Lip 70 has sufficient resiliency to exert a sealing force against surface 66. When gate 26 is closed after a fire, pressure exerted on bushing 32 forces it against surface 66 as shown in FIG. 3. With lip 70 exerting initial sealing force, any pressure passing through chamber 14 is exerted on the inner or back surface 74 of lip 70 to create additional force urging lip 70 into tighter sealing engagement with surface 66. Thus, when valve 10 has been subjected to fire, sealing ring 68 is destroyed but lip maintains a metal-to-metal seal. With both bushings 30 and 32 being of the same construction, sealing is provided in case of fire regardless of which direction the fluids tend to flow through the valve. For example, if pressure in outlet 18 suddenly rises as a result of the fire, flow through valve 10 is closed and sealed in both directions as soon as gate 26 is closed and the bushing to body seal is provided around the inlet by bushing 30.

What is claimed is:

1. A gate valve comprising
   a body having an inlet to a valve chamber, and an outlet from the valve chamber and each having surfaces surrounding the openings of the inlet and outlet into the valve chamber which surfaces are transverse to the axis of its opening,
   a bonnet secured to said body and having an opening therethrough,
   a gate in said valve chamber,
   a stem connected to said gate and extending through said bonnet opening, and
   a bushing positioned between said gate and the body and surrounding the opening of said outlet in said chamber and having a surface transverse to its axis and an elastomeric seal for sealing between said transverse surface of said bushing and said transverse surface of said body surrounding said outlet,
   said transverse surface of said bushing engaging said body transverse surface surrounding said outlet, having a radial groove to provide a metal lip facing radially outward and inclined toward said body transverse surface surrounding the opening of said outlet with said lip exposed to the pressure within said valve chamber,
   said lip being sufficiently flexible to maintain a seal against said body transverse surfaces surrounding said outlet even when said elastomeric seal has been destroyed by heat and said lip is deformed by heat.

2. A gate valve according to claim 1 including
   a second bushing positioned between said gate and the body and surrounding the opening of said inlet in said chamber and having a surface transverse to its axis facing a body transverse surface surrounding the opening of said inlet and an elastomeric seal for sealing between said second bushing transverse surface and said body transverse surface surrounding said inlet,
   said transverse surface of said second bushing engaging said body transverse surface surrounding said inlet, having a radial groove to provide a metal lip facing radially outward and inclined toward said body transverse surface surrounding said inlet,
   said second bushing lip being sufficiently flexible to maintain a seal against said body transverse surface surrounding said inlet even when said elastomeric seal has been destroyed by heat and said second bushing lip is deformed by heat.

3. A gate valve according to claim 1 wherein
   said lip is positioned to provide an initial seal against the body transverse surface surrounding the opening of said outlet and said lip is exposed to chamber pressure urging it toward said transverse body surface to maintain its seal.

* * * * *